United States Patent
Odaka et al.

(10) Patent No.: US 8,388,848 B2
(45) Date of Patent: Mar. 5, 2013

(54) LIQUID SEPARATION DEVICE, FLOW CHANNEL MATERIAL AND PROCESS FOR PRODUCING THE SAME

(75) Inventors: Yoshifumi Odaka, Otsu (JP); Toshimasa Katayama, Iyo-gun (JP); Tsunemitsu Kitagawa, Osaka (JP)

(73) Assignee: Toray Industries, Inc., Tokyo (JP)

( * ) Notice: Subject to any disclaimer, the term of this patent is extended or adjusted under 35 U.S.C. 154(b) by 923 days.

(21) Appl. No.: 12/295,133

(22) PCT Filed: Mar. 31, 2007

(86) PCT No.: PCT/JP2007/055944
§ 371 (c)(1),
(2), (4) Date: Mar. 24, 2009

(87) PCT Pub. No.: WO2007/114069
PCT Pub. Date: Oct. 11, 2007

(65) Prior Publication Data
US 2010/0006504 A1    Jan. 14, 2010

(30) Foreign Application Priority Data
Mar. 31, 2006    (JP) ................................. 2006-097161

(51) Int. Cl.
B01D 61/00    (2006.01)
B01D 63/00    (2006.01)
B01D 39/00    (2006.01)
B01D 29/46    (2006.01)
C02F 1/44    (2006.01)

(52) U.S. Cl. ............... 210/652; 210/321.75; 210/321.74; 210/651; 210/488; 210/508

(58) Field of Classification Search ............. 210/321.52, 210/321.6, 321.74, 321.7, 483, 490, 508, 210/492, 493, 488; 428/196, 197; 139/116.1; 442/203
See application file for complete search history.

(56) References Cited

U.S. PATENT DOCUMENTS 4,183,993 A * 1/1980 Benstead et al. ............... 442/314
4,769,263 A * 9/1988 Bitter .......................... 428/34.5
(Continued)

FOREIGN PATENT DOCUMENTS

JP    62-41764    3/1979
JP    9-141060    6/1997
(Continued)

OTHER PUBLICATIONS

International Search Report, mailed Apr. 24, 2007.

Primary Examiner — Ana Fortuna
(74) Attorney, Agent, or Firm — RatnerPrestia

(57) ABSTRACT

A liquid separation device is provided, and is capable of suppressing the lowering of filtration function due to an increase in flow channel resistance of permeated liquid which results in a separation membrane falling in a groove of a permeated liquid flow channel material along with accompanied breakage of the separation membrane surface. A permeated liquid flow channel material is disposed on the back side of a separation membrane composed of a sheet-like material having a linear groove and a linear crest alternately arrayed on one surface or both surfaces, wherein a groove width of the linear groove in the sheet-like material is 10 to 200 μm, and a ratio of the groove width of the linear groove to the pitch of the linear groove is 0.45 or more.

13 Claims, 8 Drawing Sheets

U.S. PATENT DOCUMENTS

| | | | |
|---|---|---|---|
| 5,275,725 A * | 1/1994 | Ishii et al. | 210/321.67 |
| 5,731,065 A * | 3/1998 | Stelzmuller et al. | 428/198 |
| 6,250,060 B1 * | 6/2001 | Scheerer et al. | 57/328 |
| 6,277,282 B1 * | 8/2001 | Kihara et al. | 210/652 |
| 6,454,942 B1 * | 9/2002 | Shintani et al. | 210/321.74 |
| 6,986,428 B2 * | 1/2006 | Hester et al. | 210/488 |
| 8,061,531 B2 * | 11/2011 | Mues et al. | 210/486 |
| 2007/0095756 A1 * | 5/2007 | Hardwicke et al. | 210/652 |
| 2011/0120931 A1 * | 5/2011 | Meyer-Blumenroth et al. | 210/321.85 |

FOREIGN PATENT DOCUMENTS

| | | |
|---|---|---|
| JP | 2000-342941 | 12/2000 |
| WO | WO 2006/015461 | 2/2006 |

\* cited by examiner

LIQUID SEPARATION DEVICE, FLOW CHANNEL MATERIAL AND PROCESS FOR PRODUCING THE SAME

This is a U.S. National Phase application of application number PCT/JP2007/055944, filed Mar. 23, 2007 (which is incorporated herein by reference in its entirety), which claims priority benefit of JP 2006-097161 (filed Mar. 31, 2006).

TECHNICAL FIELD

The present invention relates to a liquid separation device characterized by improvement of a flow channel material mainly disposed on the back side of a separation membrane.

BACKGROUND OF THE INVENTION

In one of water purifier systems, there is a water purifier system using a reverse osmosis membrane, a nanofiltration membrane or the like, and liquid separation devices such as spiral type, flat membrane type and hollow fiber type have been known. The spiral type liquid separation device has been used most widely because it can ensure a large membrane area in a given volume and treat in high efficiency.

As an ordinary spiral type liquid separation device shown in FIG. 7, a permeated liquid flow channel material 1 is sandwiched with separation membranes 2, further a feed flow channel material 3 is disposed on the outer side of the separation membrane 2 to form a set of units; and for the permeation side of the separation membrane to communicate, the unit or a plurality of the unit is wound around a hollow center tube 5 on that water collection holes 4 are arrayed.

The permeated liquid flow channel material 1 has been using a fabric where a crest and a groove are formed on its surface. As the fabric where a crest and a groove are formed on the surface, conventionally, warp knit fabric such as tricot has generally been used. In the case of tricot knit fabric, as shown in FIG. 5 (plan view) and FIG. 6 (C-C cross sectional view of FIG. 5), in a cross section perpendicular to a knitted loop direction (Y direction in FIG. 5, namely warp direction), a part that the knitted loop (needle loop 7) is present forms a linear crest 11 and supports the separation membrane, and a region between knitted loops (sinker loop 8) forms a linear groove 10, thereby to produce a flow channel of permeated liquid passed through the separation membrane.

Ordinarily, in the case of conducting desalination of sea water or separation of concentrated solutions such as fruit juice concentration efficiently by a liquid separation device using a reverse osmosis membrane as a separation membrane, a pressure is loaded so that a differential pressure of 5 to 10 MPa between the feed side and permeated liquid side is yielded. For preventing deformation of a permeated liquid flow channel material due to this pressure, the permeated liquid flow channel material is stiffened. A method that an epoxy resin or melamine resin is soaked, or melt-binding that fibers are stiffened by melt each other though heating is commonly known as the stiffening. Further, in the case where a convex part of the permeated liquid flow channel material is not flat, a fabric of the permeated liquid flow channel material is subjected to calendering because a reverse osmosis membrane may be deformed locally or nonuniformly under high pressure.

Further, there is proposed a method where a substance that a flat fabric is laminated to stiff on a fabric that a linear crest and a linear groove were formed and is used as a permeated liquid flow channel material (for example, see Patent document 1). By such constitution, a reverse osmosis membrane does not fall in because the reverse osmosis membrane is supported by the flat surface. Further, there is proposed a method that by using a double tricot as a permeated liquid flow channel material, namely by providing a flow channel on both surfaces of a flow channel material, flow channels are increased and flow channel resistance is decreased (for example, see Patent document 2). However, the former method of laminating a flat fabric poses a problem that constituent materials and production processes increase, deteriorating a production efficiency. On the other hand, the latter method that flow channels are provided on both surfaces of a flow channel material by using a double tricot also poses a problem that the number of units capable of being inserted into a module decreases because the total thickness becomes large, and deteriorating a treatment efficiency. Since tricot cannot narrows the width of a linear crest, it is not possible to increase the number of channels per unit width of a flow channel material. Therefore, the channel width must be widened to reduce the flow channel resistance of permeated liquid; by doing so, there is a problem that a reverse osmosis membrane undergoes a creep deformation with time and falls in.

Patent document 1: Japanese Unexamined Patent Publication No. 2000-342941 (p. 2 to 6)
Patent document 2: Japanese Unexamined Patent Publication Hei 9-141060 (1997) (p. 2 to 6)

SUMMARY OF INVENTION

The present invention provides a liquid separation device preventing a separation membrane from falling in, and having a small flow channel resistance by improving drawbacks of the conventional techniques, narrowing the width of a groove and increasing the number of grooves per unit width of a flow channel material without increasing constituent materials, production processes and the whole thickness.

The present invention comprises any one of the following constitutions.

(1) A liquid separation device comprising a permeated liquid flow channel material disposed on the back side of a separation membrane, wherein the permeated liquid flow channel material is composed of a sheet-like material that a linear groove and a linear crest are alternately arrayed on one surface or both surfaces, a groove width of the linear groove in said sheet-like material is 10 to 200 μm, and a ratio of the groove width of the linear groove to the pitch of the linear groove is 0.45 or more.

(2) The liquid separation device described in (1), wherein said permeated liquid flow channel material is a weft knit fabric, and said linear crest is formed by arraying convex parts of yarn loop in a line.

(3) A liquid separation device comprising a permeated liquid flow channel material disposed on the back side of a separation membrane, wherein the permeated liquid flow channel material is composed of a sheet-like material that a linear groove and a linear crest are alternately arrayed on one surface or both surfaces, said sheet-like material is a weft knit fabric consisting of a needle loop and a sinker loop, and a ratio [S1/(S1+S2)] of needle loop area (S1) to the sum of needle loop area (S1) and sinker loop area (S2) is 0.4 to 0.6.

(4) The liquid separation device described in (2) or (3), wherein the knit structure of said weft knit fabric is a structure of plain knitting and/or a structure of interlock knitting.

(5) The liquid separation device described in any one of (2) to (4), wherein an outer diameter of a knitting yarn of the weft knit fabric is 15 μm or more, and 244 μm or less.

(6) The liquid separation device described in any one of (1) to (5), wherein a thickness of the sheet-like material is 30 to 300 μm, and a depth of the groove is 15 to 290 μm.
(7) A flow channel material comprising a sheet-like material being a warp weft knit fabric, which has a linear groove and a linear crest alternately on one surface or both surfaces of the sheet-like material, wherein the groove width of the linear groove is 10 to 200 μm, and a ratio of the groove width of the linear groove to the pitch of the linear groove is 0.45 or more.
(8) A flow channel material comprising a sheet-like material that a linear groove and a linear crest are alternately arrayed on one surface or both surfaces, wherein said sheet-like material is a weft knit fabric consisting of a needle loop and a sinker loop, and a ratio [S1/(S1+S2)] of needle loop area (S1) to the sum of needle loop area (S1) and sinker loop area (S2) is 0.4 to 0.6.
(9) The flow channel material described in (7) or (8), wherein the knit structure of said weft knit fabric is a structure of plain knitting and/or a structure of interlock knitting.
(10) A method for producing a flow channel material, in producing a flow channel material composed of a sheet-like material that a linear groove and a linear crest are alternately arrayed on one surface or both surfaces, and said sheet-like material is a weft knit fabric, wherein a sinker thickness and a needle thickness in a knitting machine are adjusted so that the groove width of the linear groove is 10 to 200 μm, and a ratio of the groove width of the linear groove to the pitch of the linear groove is 0.45 or more.
(11) The method for producing a flow channel material described in (10), wherein a weft knit fabric is knitted with a filament mixed yarn consisting of two or more kinds of filaments having difference in melting points, then, thermal setting was conducted followed by calendering, at a temperature of the melting point of a lower melting point resin filament or higher and less than the melting point of a higher melting point resin filament composing said filament mixed yarn.
(12) The method for producing a flow channel material described in (10), wherein a weft knit fabric is knitted with a filament containing a composite yarn that a lower melting point resin is disposed on the outer layer of a higher melting point resin, then, thermal setting was conducted followed by calendering, at a temperature of the melting point of the lower melting point resin or higher and less than the melting point of the higher melting point resin composing said filament.
(13) The method for producing a flow channel material described in any one of (10) to (12), wherein the knit structure of said weft knit fabric is a structure of plain knitting and/or a structure of interlock knitting.
(14) A separation membrane module, wherein the liquid separation device described in any one of (1) to (6) is equipped in a pressure container.
(15) A treatment method using a separation membrane for desalinating sea water by the liquid separation device described in any one of (1) to (6).

According to an embodiment of the present invention, the groove width of a linear groove relative to the pitch of a linear groove can be increased, so the number of grooves per unit width of a flow channel material can be increased without narrowing the groove width. Hence, it becomes possible to achieve a shape ensuring a cross-sectional area of a groove per unit width of a permeated liquid flow channel material and lowering the flow channel resistance as well as narrowing the groove width of a flow channel material to prevent a separation membrane from falling in the groove of a permeated liquid flow channel material. As a result, it becomes possible to prevent a reverse osmosis membrane from falling in without increasing constituent materials, production processes and the whole thickness, and it becomes possible to ensure a flow channel of the permeated liquid and prevent deterioration of the function of the separation membrane.

Figure 1:
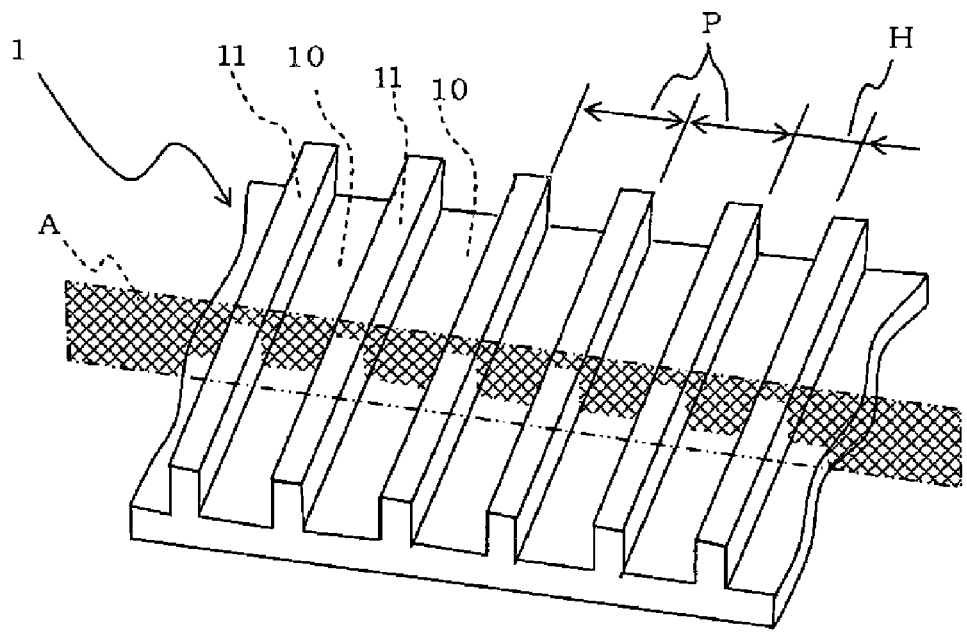
FIG. 1 is a perspective view schematically showing a permeated liquid flow channel material according to an embodiment of the present invention.

| DESCRIPTION OF NUMBER AND SYMBOL | |
|---|---|
| 1: | Flow channel material |
| 2: | Reverse osmosis membrane |
| 3: | Feed flow channel material |
| 4: | Water collection hole |
| 5: | Center tube |
| 6: | Module |
| 7: | Needle loop |
| 7': | Needle loop |
| 8: | Sinker loop |
| 8': | Sinker loop |
| 10: | Linear groove |
| 11: | Linear crest |
| 12: | A point present in the farthermost place from the central part of needle loop 7 among intersections of yarn composing a needle loop 7 and yarn composing a needle loop 7' adjacent to the opening side of the needle loop 7. |
| 12': | A point present in the farthermost place from the central part of needle loop 7 among intersections of yarn composing a needle loop 7 and yarn composing a needle loop 7' adjacent to the opening side of the needle loop 7. |
| 13: | A point present in the farthermost place from the central part of sinker loop 8 among intersections of yarn composing a sinker loop 8 and yarn composing a sinker loop 8' adjacent to the opening side of the sinker loop 8. |
| 13': | A point present in the farthermost place from the central part of sinker loop 8 among intersections of yarn composing a sinker loop 8 and yarn composing a sinker loop 8' adjacent to the opening side of the sinker loop 8. |
| 14: | Filtration pressure |
| 15: | Non-woven fabric |
| 16: | Polysulfone support membrane |
| 17: | Aromatic polyamide membrane |
| X: | Course direction |
| Y: | Wale direction (knitted loop direction) |

DETAILED DESCRIPTION

Hereinafter, embodiments of the present invention are further detailed.

The liquid separation device of an embodiment of the present invention comprises a permeated liquid flow channel material disposed on the back side of a separation membrane. The permeated liquid flow channel material is characterized in that it is composed of a sheet-like material that a linear groove and a linear crest are alternately arrayed on one surface or both surfaces, a groove width of the linear groove in said sheet-like material is 10 to 200 μm, and a ratio of the groove width of the linear groove to the pitch of the linear groove is 0.45 or more.

In designing a shape of a permeated liquid flow channel material, when the groove width of a linear groove is increased to enlarge a flow channel for reducing flow channel resistance of permeated liquid, falling in of a separation membrane becomes large. As a result, a large tensile force behave locally on the surface of a separation membrane; when the tensile force exceeds the fracture stress of a separation membrane, the separation membrane breaks, deteriorating the function of the separation membrane. The flow channel is clogged by falling in of a separation membrane, which increases flow resistance adversely. On the other hand, when the groove width of a linear groove is decreased, flow channel becomes narrow and flow channel resistance becomes large even though falling in of a separation membrane can be suppressed.

From these viewpoints, a groove width of the linear groove in the permeated liquid flow channel material is set to 200 μm or less to prevent a separation membrane from falling in a linear groove. It is also set to 10 μm or more to reduce the flow channel resistance. Further, a ratio of the groove width to the pitch of the linear groove of the sheet-like material (hereinafter referred to as groove width/pitch ratio) is 0.45 or more to ensure the cross-sectional area of groove of a flow channel material. The upper limit of the groove width/pitch ratio is preferably 0.93 or less in order to suppress the reduction of the separation membrane-supporting area of a linear crest supporting a separation membrane receiving a separation pressure, and to prevent breakage of a linear crest due to concentration of the separation pressure.

Figure 2:
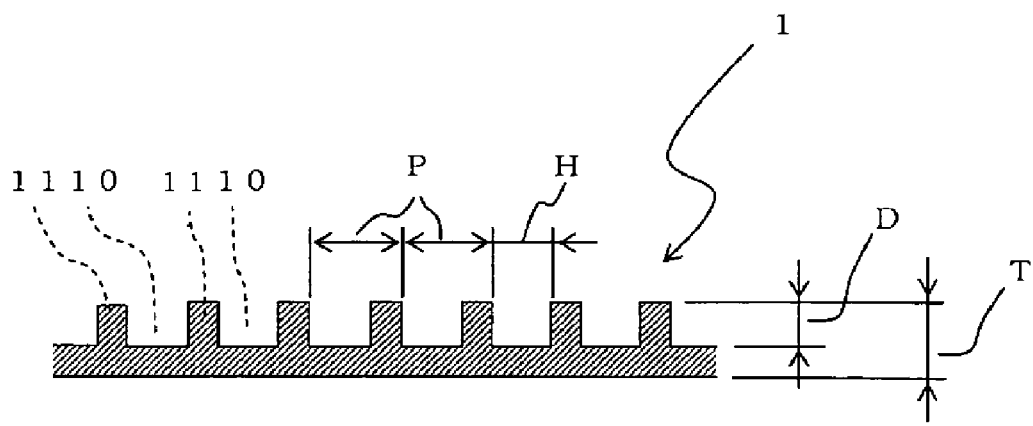
FIG. 2 is a view schematically showing A-cross section of FIG. 1.

Additionally, a groove width of a linear groove denotes a distance H shown in FIG. 1 (perspective view schematically showing the flow channel material of an embodiment of the present invention) and FIG. 2 (view schematically showing A-cross section of FIG. 1), and a pitch of a linear groove denotes a distance P shown in FIGS. 1 and 2. A separation membrane is disposed in the front surface of flow channel material 1 in FIG. 1, and disposed above a flow channel material 1 in FIG. 2.

Figure 3:
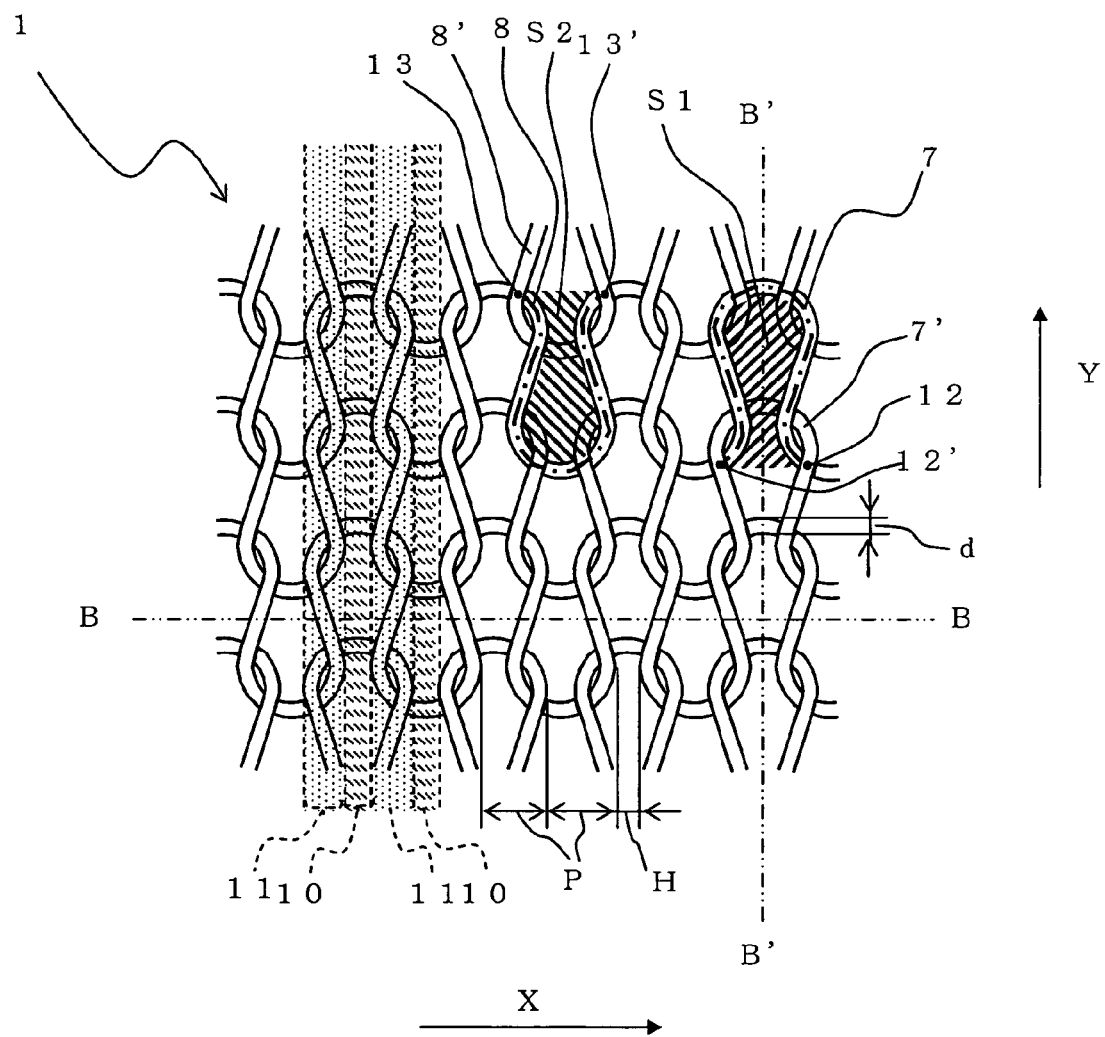
FIG. 3 is a plan view schematically showing another permeated liquid flow channel material according to an embodiment of the present invention.
Figure 4:
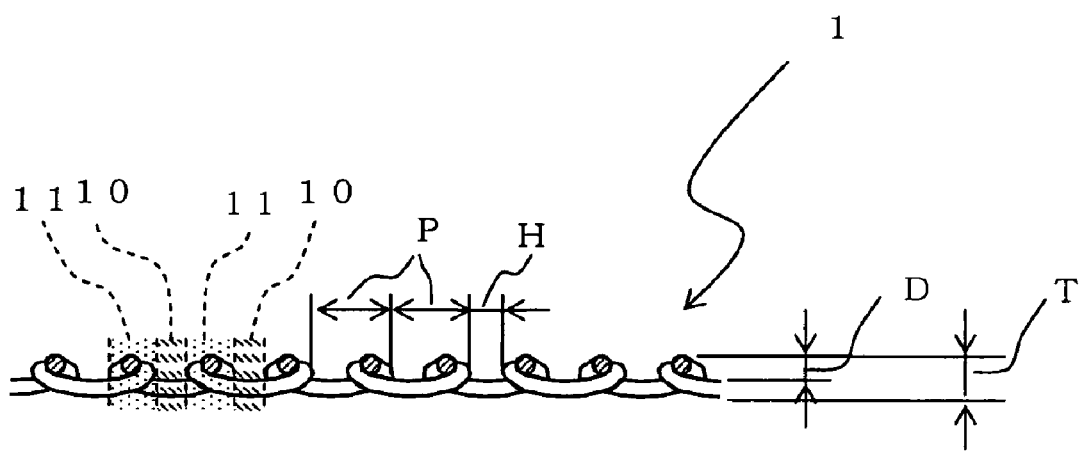
FIG. 4 is a cross-sectional view schematically showing B-B cross section of FIG. 3.
Figure 5:
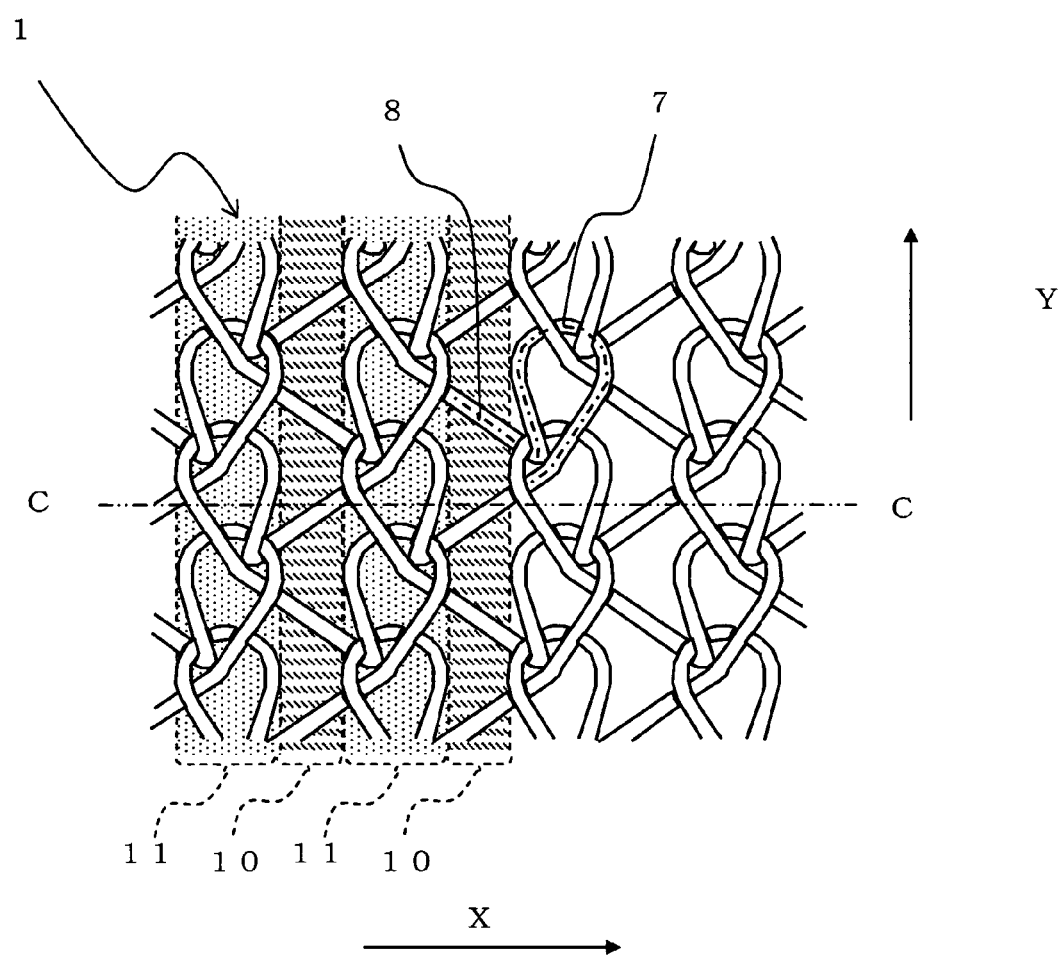
FIG. 5 is a plan view schematically showing a conventional permeated liquid flow channel material constituted with tricot.
Figure 6:
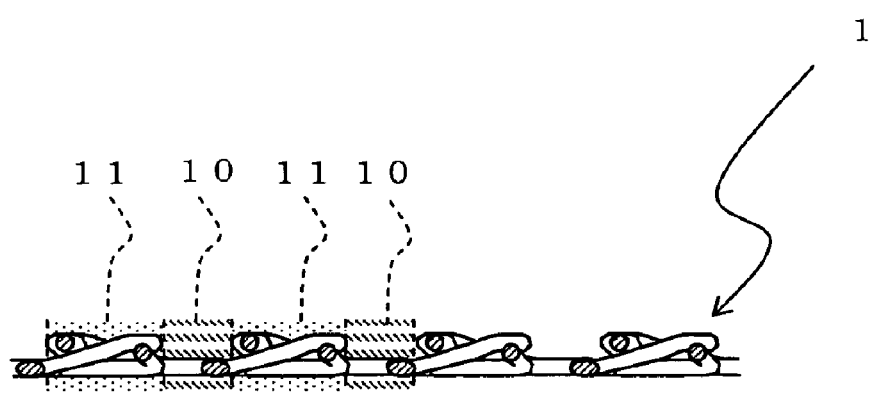
FIG. 6 is a view schematically showing C-C cross section of FIG. 5.
Figure 7:
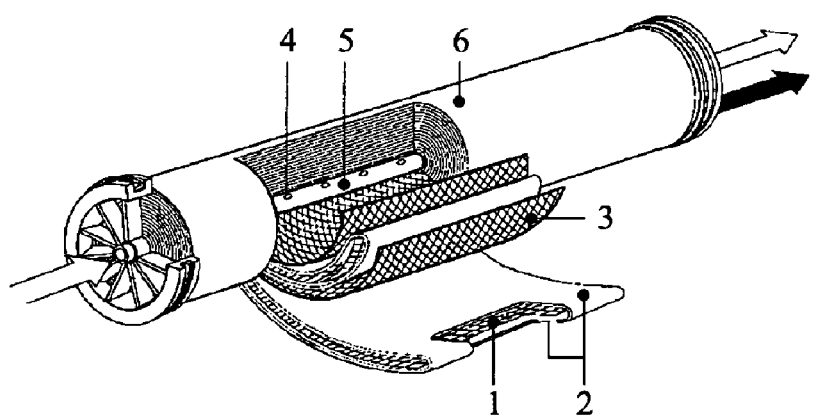
FIG. 7 is a schematic perspective view showing an ordinary spiral-type liquid separation device.

The permeated liquid flow channel material used in an embodiment of the present invention has the structural features described above; from the points capable of yielding high quality at a low price as well, it is preferable to use a weft knit fabric as shown in FIGS. 3 and 4. Further when a weft knit fabric is used as the permeated liquid flow channel material, to make the groove width/pitch ratio large, respective linear crests repeated are preferably formed by arraying convex parts of yarn loop in a line. Specifically, it can be exemplified by a weft knit fabric with a structure of plain knitting and/or a structure of interlock knitting.

In the case where a weft knit fabric is used as a permeated liquid flow channel material, as shown in FIGS. 3 and 4, a linear crest 11 is formed by linking the convex parts of each sinker loop 8 and needle loop 7 in a line in wale direction Y, and a linear groove 10 is formed between said linear crests 11. Namely, since sinker loop 8 and needle loop 7 each form a linear groove 10, it becomes possible to increase the number of linear grooves per unit width. Hence, this prevents a separation membrane from falling in a linear groove, so it is possible to narrow the groove width of linear groove 10, and also ensure the cross-sectional area of groove per unit width and reduce the flow channel resistance.

The permeated liquid flow channel material having such groove width and groove width/pitch ratio is also obtained by adopting a weft knit fabric consisting of the needle loop 7 and sinker loop 8, and setting a ratio [S1/(S1+S2)] of needle loop area (S1) to the sum of needle loop area (S1) and sinker loop area (S2) to be 0.4 to 0.6. Namely, it is also obtained by setting the needle loop area (S1) and the sinker loop area (S2) to be substantially equal. When the difference between the needle loop area and the sinker loop area becomes large, the flow channel resistance of a linear groove formed in a loop whose loop area is small becomes markedly large, so that an averaged flow channel resistance of the flow channel resistance of linear groove of the sinker loop and that of the needle loop increases. Therefore, to prevent deterioration of the averaged flow channel resistance of the linear grooves, a ratio [S1/(S1+S2)] is preferably set to 0.4 to 0.6.

For [S1/(S1+S2)] to be such ratio, a sinker thickness and a needle thickness in a knitting machine may be adjusted. In this case, from the point that areas of needle loop 7 and sinker loop 8 are easily adjusted, a knit structure of a weft knit fabric used as a permeated liquid flow channel material is preferably a structure of plain knitting and/or interlock knitting.

The needle loop area (S1) and sinker loop area (S2) are measured as follows. First, the surface of a permeated liquid flow channel material is zoomed in a range of 10 to 1000 times from a direction perpendicular to the surface, the enlarged picture obtained is sectionalized by a grid constituted by parallel lines equally dividing by 5 μm in both wale direction Y and course direction X. Areas of grids containing one loop (needle loop or sinker loop) are summed, which is defined as an area of the loop. By doing other 9 loops consecutive in the course direction X to the loop in the same manner as described above, an area of each grid is calculated. A value that 10 data obtained are arithmetically averaged is defined as the needle loop area (S1) and sinker loop area (S2) in an embodiment of the present invention.

Additionally, the needle loop 7 is a loop formed by a needle in a weft knitting machine; the needle loop area (S1), as shown in FIG. 3, is an area in a range surrounded by an inner boundary line of yarn composing one needle loop 7. In calculating the area, as shown in FIG. 3, the edge part of an opening side of a needle loop is a line linking points 12 and 12' present in the farthermost place from the central part of needle loop 7 among intersections of yarn composing one needle loop 7 and yarn composing a needle loop 7' adjacent to the opening side of the needle loop 7. Therefore, the needle loop area (S1) is an area in a range surrounded by a line linking the points 12 and 12' and a yarn composing the needle loop 7.

On the other hand, the sinker loop 8 is a loop formed by a sinker in a weft knitting machine; the sinker loop area (S2), as shown in FIG. 3, is an area in a range surrounded by an inner boundary line of yarn composing one sinker loop 8. In calculating the area, as shown in FIG. 3, the edge part of an opening side of a sinker loop is a line linking points 13 and 13' present in the farthermost place from the central part of sinker loop 8 among intersections of yarn composing one sinker loop 8 and yarn composing a sinker loop 8' adjacent to the opening side of the sinker loop 8. Therefore, the sinker loop area (S2) is an area in a range surrounded by a line linking the points 13 and 13' and a yarn composing the sinker loop 8

In the case where a weft knit fabric is used as a permeated liquid flow channel material, as shown in FIGS. 3 and 4, the groove width H of a linear groove is represented by a length in the course direction X of a void part between yarns in the narrowest part of each opening of needle loop and sinker loop. Specifically, lengths of void parts between yarns at openings of 10 loops successive in the course direction X are measured, and by obtaining an arithmetic average of these 10 values, the groove width H can be calculated. On the other hand, as shown in FIGS. 3 and 4, the pitch of a linear groove is represented by a distance between yarns present adjacently at the center part of the wale direction Y of loop (place of B-B line in FIG. 3). Specifically, distances between 11 yarns (total 10) adjacent in the course direction X are measured, and by obtaining an arithmetic average of the 10 values obtained, the groove pitch P can be calculated. In FIG. 3, a separation membrane is disposed in the front surface of a flow channel material 1, and in FIG. 4, it is disposed above a flow channel material 1.

In the case where a weft knit fabric is used as a permeated liquid flow channel material, from the viewpoint of suppressing an increase in thickness of a permeated liquid flow channel material, using a yarn with an outer diameter of 244 μm or less is preferable. On the other hand, from the viewpoint of suppressing a decrease in groove depth of a linear groove, using a yarn with an outer diameter of 15 μm or more is preferable. Further, it is preferable to knit under conditions of knitting such that a pitch of a linear groove is 1.8 or more times of the outer diameter of a yarn, and larger than the outer diameter of a yarn, further, the difference between the pitch of a linear groove and the outer diameter of a yarn is 10 to 200 μm. By setting such constitutions, it becomes easy that a groove width of the linear groove is 10 to 200 μm, and a ratio of the groove width of the linear groove to the pitch of the linear groove is 0.45 or more. Additionally, as shown in FIG. 3, the outer diameters of 10 yarns adjacent each other in the wale direction Y at the center part of the course direction X of loop (place of B'-B' line in FIG. 3) are measured, and the outer diameter, d of a yarn is an arithmetic average of the 10 values obtained A fiber material composing a weft knit fabric may be any one as long as it maintains a shape as a permeated liquid flow channel material and it has few component solving into a permeating liquid; for example, there are listed organic fibers including polyamide fibers such as nylon 6 and nylon 66, polyester fibers, polyacrylic fibers, polyolefin fibers such as polyethylene and polypropylene, polyvinylchloride fiber, polyvinylidene chloride fiber, polyfluoroethylene fiber and carbon fiber. In particular, it is preferable to use polyester fibers from the considerations of strength sustainable under high pressure and easy processing of a weft knit fabric described later and the like.

In an embodiment of the present invention, to suppress deformation of a flow channel material itself under high pressure, stiffening of the permeated liquid flow channel material is preferably conducted to enhance rigidity. As a method of stiffening, for example, a method that a resin such as melamine resin or epoxy resin is soaked in a woven or knit fabric as a permeated liquid flow channel material can be mentioned. Further, there is a method of conducting melt-binding (calendering) that a weft knit fabric as a permeated liquid flow channel material is heated for fibers to be melted and solidified each other. In an embodiment of the present invention, any method can be used as long as it is a treatment method that can obtain hardness yielding no deformation of a flow channel material itself under high pressure.

Further, calendering may be conducted so that a separation membrane does not undergo a local or nonuniform deformation under high pressure. By calendering, a permeated liquid flow channel material such as a weft knit fabric becomes very smooth and flat since minute undulation derived from a fiber shape is collapsed. Therefore, it becomes possible to further improve performances and durability because a separation membrane does not deform nonuniformly under high pressure.

When a weft knit fabric with a structure of plain knitting and/or a structure of interlock knitting are used as a permeated liquid flow channel material and the permeated liquid flow channel material is subjected to calendering, in knitting the permeated liquid flow channel material, it is preferable that a filament mixed yarn consisting of two or more kinds of filaments having difference in melting points is knitted, then, thermal setting is conducted for calendering at a temperature of the melting point of a lower melting point resin filament or higher and less than the melting point of a higher melting point resin filament composing said filament mixed yarn. It is also preferable that a permeated liquid flow channel material is knitted with a filament containing a composite yarn that a lower melting point resin is disposed on the outer layer of a higher melting point resin, then, thermal setting is conducted for calendering at a temperature of the melting point of a lower melting point resin or higher and less than the melting point of a higher melting point resin composing said filament.

In an embodiment of the present invention, regarding a thickness of a sheet-like material, the number of units which can be inserted in a module decreases when the thickness is large, which poses a problem of the lowering of treatment capability, so it is preferably 300 μm or less. It is preferably 30 μm or more because the cross-sectional area of a groove is small and flow channel resistance increases when the thickness is small.

Additionally, a thickness of a sheet-like material T is a distance between the front surface and rear surface in a direction perpendicular to the surface direction as shown in FIGS. 2 and 4, and can be measured by using a micrometer of dial gauge shape with reference to JIS P8118 (1976). Namely, using a micrometer of dial gauge shape having a structure that it has two flat surfaces, a diameter of a smaller surface of the flat surfaces is 14.3 mm, the two surfaces are parallel within 0.005 mm in accuracy, and the other surface moves in a direction perpendicular to said flat surface, a sheet-like material is sandwiched by the two surfaces under a constant pressure of 53.9±4.9 kPa, and the thickness can be obtained by reading the scale of at least 0.002 mm in thickness. In this way, an arithmetic average of the values measured at 10 places is defined as a thickness of a sheet-like material T.

Regarding a depth of a groove in a sheet-like material, when the depth is large, the thickness of the sheet-like material becomes inevitably large, and the number of units which can be inserted in a module decreases, which poses a problem of the lowering of treatment capability. Hence, it is preferably 290 μm or less. It is preferably 15 μm or more because the cross-sectional area of a groove is small and the flow channel resistance increases when the depth is small.

Additionally, a depth of a groove D is a distance from a part protruding most on the surface to the bottom of a groove as shown in FIGS. 2 and 4; in the case of a weft knit fabric shown in FIG. 4, it is equal to a value that the outer diameter of a yarn is subtracted from a thickness of a sheet-like material T.

The permeated liquid flow channel material described above is disposed on the rear surface of a separation membrane so as to support the separation member. In an embodiment of the present invention, a separation membrane includes a reverse osmosis membrane, nanofiltration membrane, ultrafiltration membrane and microfiltration membrane, and each can be produced by a known method.

A separation membrane and a permeated liquid flow channel material are wound around a water collection tube spirally together with a feed flow channel material, thereby to give a liquid separation device. The liquid separation device is introduced in a pressure container alone or in plurality thereof, which is used for desalinating sea water or the like in the mode of a separation membrane module.

EXAMPLES

Hereinafter, embodiments of the present invention will be further described specifically by Examples, but the present invention is by no means limited to these Examples.

Measurement techniques and simulation techniques conducted in Examples and Comparative examples are explained below.

<<Measurement Technique>>

A permeated liquid flow channel material was sandwiched by two reverse osmosis membranes of 150 μm thickness, further, a feed flow channel material was disposed on the outside of the reverse osmosis membranes to give a set of units; by incorporating it in a module of 0.2 m in outer diameter and 1 m in length, a reverse osmosis membrane module was produced. Using this reverse osmosis membrane module, sea water having the total dissolved solids of 3.5% by weight was continuously treated for 10 days by giving a pressure difference of 5.5 MPa at a liquid temperature of 25° C., thereby to obtain the volume of permeated water per day and salt rejection factor after 10 days for evaluation.

Here, the volume of permeated water is a water volume $(m^3/(m^2 \cdot d))$ permeating through a unit area (m2) being converted to a unit time (day (d)), and salt rejection factor is expressed by the following formula (I). Respective ten reverse osmosis membrane modules were measured, and it was expressed by an arithmetic average thereof.

Salt rejection factor (%)={1−(salt concentration in permeated liquid)/(salt concentration in feed liquid)}×100    (1)

Regarding a groove width (H) and a pitch (P) of a linear groove in a permeated liquid flow channel material, the surface of a permeated liquid flow channel material was photographed with a microscope, ten data was taken from the micrograph obtained, and it was expressed by an arithmetic average thereof.

A thickness of a permeated liquid flow channel material (T) was measured using a micrometer of dial gauge shape having a structure that it had two flat surfaces, a diameter of a smaller surface thereof was 14.3 mm, the two surfaces were parallel within 0.005 mm in accuracy, and the other surface moved in a direction perpendicular to said flat surface. A sheet-like material was sandwiched by the two surfaces of the micrometer under a constant pressure 53.9±4.9 kPa, and the thickness was read to at least 0.002 mm in thickness. Ten places were measured, and it was expressed by an arithmetic average thereof.

A depth of a groove (D) in a permeated liquid flow channel material was expressed by a value that the outer diameter of a yarn (d) was subtracted from the thickness of a permeated liquid flow channel material (T). Here, regarding the outer diameter of a yarn (d) in the permeated liquid flow channel material, as shown in FIG. 3, ten yarns next to each other in a wale direction Y were measured for the outer diameters at the center part of a course direction X of loop (place of B'-B' line in FIG. 3), and it was expressed by an arithmetic average thereof.

<<Simulation Technique>>

Figure 9:
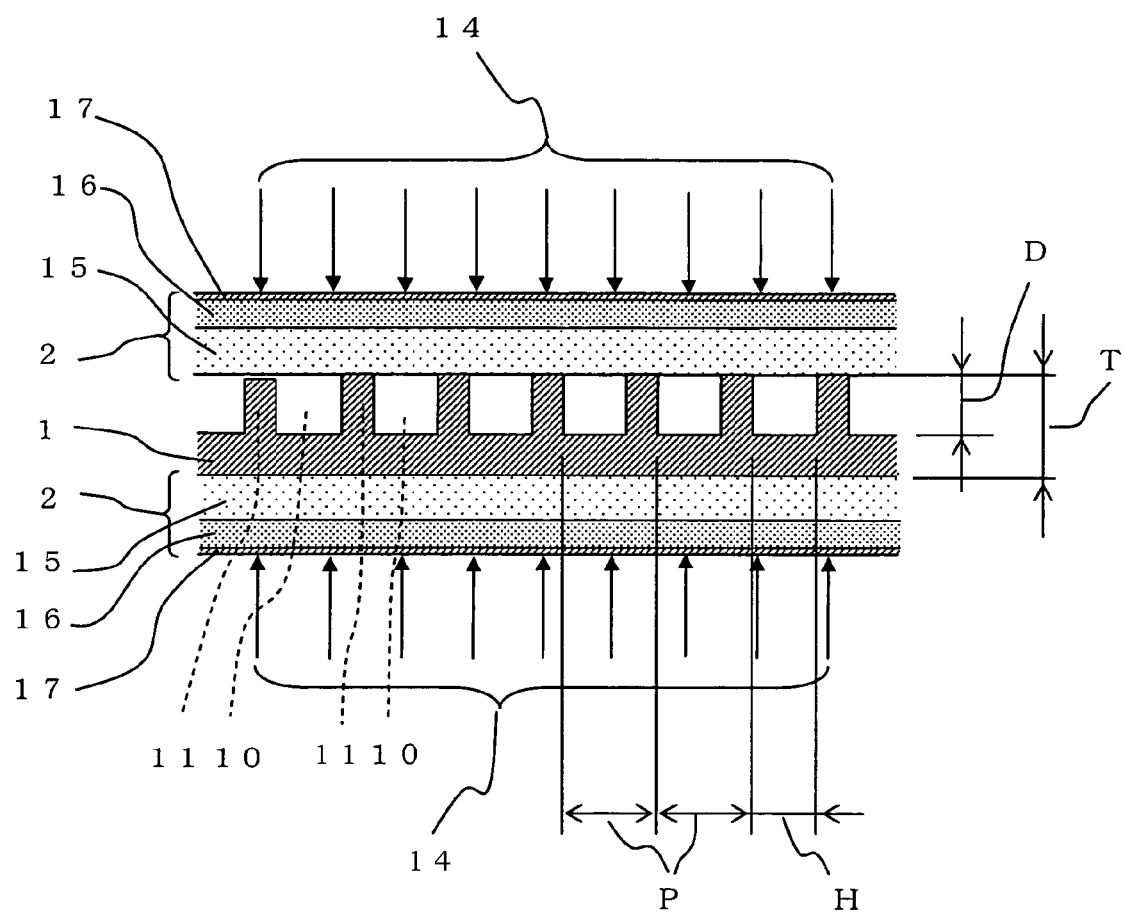
FIG. 9 is a schematic diagram of the numerical calculation model used as a simulation technique in Examples and Comparative examples.

As shown in FIG. 9, a permeated liquid flow channel material 1 was sandwiched with two reverse osmosis membranes 2 of 150 μm consisting of an aromatic polyamide membrane 17 (thickness of 0.2 μm), a porous polysulfone support membrane 16 (thickness of 49.8 μm) and a non-woven 15 (base weight of 85 g/m², thickness of 100 μm) composed mainly of polyethylene terephthalate fiber. Further, a structural analysis model giving a filtration pressure of 5.5 MPa on the surface at the side of aromatic polyamide membrane 17 of the reverse osmosis membrane 2 uniformly was produced, and using a general non-linear structural analysis solver MARC manufactured by MSC Corporation, deformation of the permeated liquid flow channel material and reverse osmosis membrane after 10 days passed was simulated, thereby to evaluate good or bad in liquidity of permeated liquid, existence of breakage of membrane, and existence of breakage of the permeated liquid flow channel material.

Here, in regard to the liquidity of permeated liquid, a reverse osmosis membrane module was produced as described in the measurement technique; when sea water of the total dissolved solids of 3.5% by weight was treated with the module by giving a pressure difference of 5.5 MPa at a liquid temperature of 25° C., the case that the volume of permeated water is 22 m³/day or more was determined as "good", and the case that the volume of permeated water is less than 22 m³/day was determined as "bad."

In regard to the existence of breakage of membrane, the case that there was a place where the strain amount of an aromatic polyamide membrane in the reverse osmosis membrane was 2% or more was determined as "existence", and the case that there was no place where the strain amount was more than 2% was determined as "none."

In regard to the existence of breakage of the permeated liquid flow channel material, the case that a principal stress of 40 MPa or more was generated in the permeated liquid flow channel material was determined as "existence", and the case that a principal stress of 40 MPa or more was not generated in the permeated liquid flow channel material was determined as "none."

Example 1

Measurement techniques and simulation techniques were conducted.

<<Measurement Technique>>

A multi-filament yarn (48 filaments, 110 dtex) that a polyethylene terephthalate filament (melting point: 255° C.) was mixed with a polyethylene terephthalate-type lower melting point filament (melting point: 235° C.) was used as a knitting yarn; a weft knit structure of a plain knitting (gauge (the number of needles per unit length in a knitting machine) 32) was knitted, which was subjected to thermal setting at 245° C., then to calendering, thereby to produce a permeated liquid flow channel material that the groove width was 130 μm, a ratio of the groove width to the pitch of a linear groove was 0.52, the depth of a linear groove was 110 μm, the thickness was 220 μm and a ratio [S1/(S1+S2)] of needle loop area (S1) to the sum of needle loop area (S1) and sinker loop area (S2) was 0.48.

When a reverse osmosis module incorporated with this permeated liquid flow channel material was used, the volume of permeated water was 24 m³/day and salt rejection factor was 99.75%.

<<Simulation Technique>>

For the case done in the same manner as in the above-described implementation techniques, evaluations were conducted by the simulation technique. As a result, the liquidity of permeated liquid was good, and there was no damage in both membrane and permeated liquid flow channel material.

Example 2

Evaluations were conducted by the same simulation technique as in Example 1 except for using a permeated liquid flow channel material that the groove width was 80 μm, a ratio of the groove width to the pitch of a linear groove was 0.50, the depth of a linear groove was 80 μm and the thickness was 170 μm. As a result, the liquidity of permeated liquid was good, and there was no damage in both membrane and permeated liquid flow channel material.

Example 3

Evaluations were conducted by the same simulation technique as in Example 1 except for using a permeated liquid flow channel material that the groove width was 192 μm, a ratio of the groove width to the pitch of a linear groove was 0.90, the depth of a linear groove was 21 μm and the thickness was 50 μm. As a result, the liquidity of permeated liquid was good, and there was no damage in both membrane and permeated liquid flow channel material.

Example 4

Evaluations were conducted by the same simulation technique as in Example 1 except for using a permeated liquid flow channel material that the groove width was 170 μm, a ratio of the groove width to the pitch of a linear groove was 0.68, the depth of a linear groove was 80 μm and the thickness was 170 μm. As a result, the liquidity of permeated liquid was good, and there was no damage in both membrane and permeated liquid flow channel material.

Example 5

Evaluations were conducted by the same simulation technique as in Example 1 except for using a permeated liquid flow channel material that the groove width was 19 μm, a ratio of the groove width to the pitch of a linear groove was 0.47, the depth of a linear groove was 21 μm and the thickness was 50 μm. As a result, the liquidity of permeated liquid was good, and there was no damage in both membrane and permeated liquid flow channel material.

Comparative Example 1

Measurement techniques and simulation techniques were conducted.

<<Measurement Technique>>

A multi-filament yarn (48 filaments, 155 dtex) that a polyethylene terephthalate filament (melting point: 255° C.) was mixed with a polyethylene terephthalate-type lower melting point filament (melting point: 235° C.) was used as a knitting yarn; it was knitted into a tricot fabric (structure of double denbigh, gauge 28), which was subjected to thermal setting at 245° C., then to calendering, thereby to produce a permeated liquid flow channel material that the groove width was 254 μm, a ratio of the groove width to the pitch of a linear groove was 0.43, the depth of a linear groove was 110 μm, the thickness was 220 μm and a ratio [S1/(S1+S2)] of needle loop area (S1) to the sum of needle loop area (S1) and sinker loop area (S2) was 0.38.

In this permeated liquid flow channel material, the groove width became large because it was a tricot fabric with a small gauge compared with Example 1, and the width of crest became wide because of thick yarn and tricot knitting, and a ratio of the groove width to the pitch of a groove became small. Since the sinker loop area (S2) was large compared to the needle loop area (S1), the groove width of the linear groove of sinker loop became wider than the groove width of the linear groove of needle loop.

Evaluations were conducted by the same measurement technique as in Example 1. As a result, the volume of permeated water was 20 m³/day and salt rejection factor was 99.70%. Since the groove width of a linear groove in the permeated liquid flow channel material was wide, the reverse osmosis membrane fell in markedly. As a result, in comparison with Example 1, the flow channel resistance of permeated liquid became large, and the volume of permeated water decreased. Further, a large tensile force was generated on the surface of the reverse osmosis membrane, breakage was locally generated, the function of the reverse osmosis membrane deteriorated and salt rejection factor deteriorated. In particular, since the groove width of the linear groove of sinker loop was wider than that of needle loop, falling in the linear groove of sinker loop is larger than in the linear groove of needle loop, and a lot of local breakage of the reverse osmosis membrane was generated in the linear groove of the sinker loop.

<<Simulation Technique>>

For the case done in the same manner as in the above-described implementation techniques, evaluations were conducted by a simulation technique. As a result, the reverse osmosis membrane markedly fell in the linear groove of the permeated liquid flow channel material by a filtration pressure, so the liquidity of permeated liquid became bad. Strain of the surface of the reverse osmosis membrane became large resulting from falling in of the reverse osmosis membrane, and breakage was observed in the reverse osmosis membrane. In particular, a lot of breakage of the osmosis membrane was generated in the linear groove of the sinker loop compared with the linear groove of the needle loop. Additionally, no breakage of the permeated liquid flow channel material was observed.

Comparative Example 2

Measurement techniques and simulation techniques were conducted.

<<Measurement Technique>>

The same multi-filament yarn (48 filaments, 110 dtex) as in Example 1 was used as a knitting yarn; it was knitted into a tricot fabric (structure of double denbigh, gauge 32), which was subjected to thermal setting at 245° C., then to calendering, thereby to produce a permeated liquid flow channel material that the groove width was 254 μm, a ratio of the groove width to the pitch of a linear groove was 0.52, the depth of a linear groove was 110 μm, the thickness was 220 μm and a ratio [S1/(S1+S2)] of needle loop area (S1) to the sum of needle loop area (S1) and sinker loop area (S2) was 0.63. Since the needle loop area (S1) was large compared with the sinker loop area (S2), the groove width of the linear groove of needle loop became wider than that of sinker loop.

This permeated liquid flow channel material was the one using a tricot fabric knitted with the same yarn and the same gauge number as in Example 1, but the crest width of a linear crest became wide and the groove width also became wide because of tricot knitting.

Evaluations were conducted by the same measurement technique as in Example 1 except that this permeated liquid flow channel material was incorporated. As a result, the volume of permeated water was 19 m³/day and salt rejection factor was 99.60%. Since the groove width of a linear groove in the permeated liquid flow channel material was wide, the reverse osmosis membrane fell in markedly, the flow channel resistance of permeated liquid became large, and the volume of permeated water became small. A large tensile stress was generated on the surface of the reverse osmosis membrane, and breakage was generated locally, and the salt rejection factor was lowered because the function of the reverse osmosis membrane deteriorated. In particular, since the groove width of the linear groove of needle loop was wider than that of sinker loop, falling in the linear groove of needle loop is larger than in the linear groove of sinker loop, and a lot of local breakage of the reverse osmosis membrane was generated in the linear groove of the needle loop.

<<Simulation Technique>>

For the case done in the same manner as in the above-described implementation techniques, evaluations were conducted by a simulation technique. As a result, the reverse osmosis membrane markedly fell in the linear groove of the permeated liquid flow channel material by a filtration pressure, so the liquidity of permeated liquid became bad. Strain of the surface of the reverse osmosis membrane became large resulting from falling in of the reverse osmosis membrane, and breakage was observed in the reverse osmosis membrane. In particular, a lot of breakage of the osmosis membrane was observed in the linear groove of the needle loop compared with the linear groove of the sinker loop. Additionally, no breakage of the permeated liquid flow channel material was observed Comparative Example 3

Measurement techniques and simulation techniques were conducted.

<<Measurement Technique>>

The same multi-filament yarn (48 filaments, 155 dtex) as in Comparative example 1 was used as a knitting yarn; it was knitted into a weft knit structure of plain knitting (gauge 28), which was subjected to thermal setting at 245° C., then to calendering, thereby to produce a permeated liquid flow channel material that the groove width was 130 μm, a ratio of the groove width to the pitch of a linear groove was 0.43, the depth of a linear groove was 110 μm, the thickness was 220 μm and a ratio [S1/(S1+S2)] of needle loop area (S1) to the sum of needle loop area (S1) and sinker loop area (S2) was 0.20.

This flow channel material was the one using a plain fabric in the same manner as in Example 1, but the yarn was thick and the gauge number was small compared with Example 1, so the crest width of a linear crest became wide, and a ratio of the groove width to the pitch of a linear groove became small. The difference between the needle loop area (S1) and sinker loop area (S2) became large.

Evaluations were conducted by the same measurement technique as in Example 1 except that this permeated liquid flow channel material was incorporated. As a result, the volume of permeated water was 20 m³/day and salt rejection factor was 99.75%. Since the groove width became narrow, falling in of the membrane was suppressed, so the salt rejection factor became high because local breakage on the surface of the reverse osmosis membrane was able to be suppressed. However, since a ratio of the groove width to the pitch of a linear groove became small, the number of grooves per constant width of the permeated liquid flow channel material became few, further the difference between the needle loop area and sinker loop area became large. As a result, the flow channel resistance became large and the volume of permeated water became small.

<<Simulation Technique>>

For the case done in the same manner as in the above-described implementation techniques, evaluations were conducted by a simulation technique. As a result, since a ratio of the groove width to the pitch of a linear groove was small, the number of grooves per width of the permeated liquid flow channel material became few, further the difference between the needle loop area and sinker loop area became large; as a result, the flow channel resistance became large and the liquidity of permeated liquid became bad. On the other hand, since the groove width was narrow, falling in of the reverse osmosis membrane was small, and no breakage of the reverse osmosis membrane was observed. No breakage of the permeated liquid flow channel material was observed as well.

Comparative Example 4

Evaluations were conducted by the same simulation technique as in Example 1 except for using a permeated liquid flow channel material that the groove width was 8 μm, a ratio of the groove width to the pitch of a linear groove was 0.45, the depth of a linear groove was 10 μm, the thickness was 23 μm and a ratio [S1/(S1+S2)] of needle loop area (S1) to the sum of needle loop area (S1) and sinker loop area (S2) was 0.61. As a result, there was no breakage of the membrane and no breakage of the permeated liquid flow channel material. However, the groove width was narrow, and the difference between the sinker loop area and needle loop area was large; as a result, the flow channel resistance became large and the liquidity of permeated liquid deteriorated.

Comparative Example 5

Evaluations were conducted by the same simulation technique as in Example 1 except for using a permeated liquid flow channel material that the groove width was 211 μm, a ratio of the groove width to the pitch of a linear groove was 0.60, the depth of a linear groove was 141 μm, the thickness was 280 μm and a ratio [S1/(S1+S2)] of needle loop area (S1) to the sum of needle loop area (S1) and sinker loop area (S2) was 0.38. As a result, the liquidity of permeated liquid was good, and no breakage of the permeated liquid flow channel material was observed. However, since the groove width was wide, deformation of the reverse osmosis membrane became large and breakage on the surface of the reverse osmosis membrane was observed. In particular, since the groove width of the linear groove of sinker loop was wider than that of needle loop, falling in the linear groove of sinker loop is larger than in the linear groove of needle loop, and a lot of local breakage was generated.

Comparative Example 6

Evaluations were conducted by the same simulation technique as in Example 1 except for using a permeated liquid flow channel material that the groove width was 120 μm, a ratio of the groove width to the pitch of a linear groove was 0.95, the depth of a linear groove was 6 µm, the thickness was 17 µm and a ratio [S1/(S1+S2)] of needle loop area (S1) to the sum of needle loop area (S1) and sinker loop area (S2) was 0.38. As a result, the liquidity of permeated liquid was good, and no breakage of the membrane was observed. However, since the ratio of the groove width to the pitch of a linear groove was large, the area of a linear crest supporting the reverse osmosis membrane decreased, a filtration pressure was concentrated on the linear crest, and there was breakage in the linear crest. Further, since the difference between the needle loop area and sinker loop area was large, a filtration pressure was not evenly loaded on each linear crest, so a part of linear crest was broken markedly.

Figure 8:
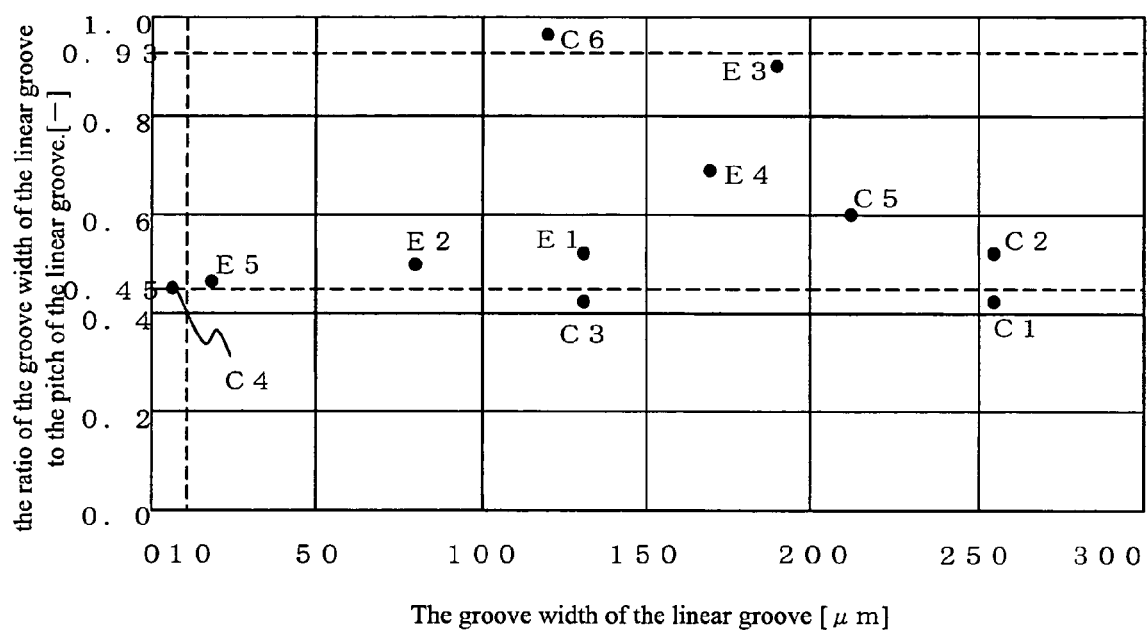
FIG. 8 is a graph showing the relationship between the groove width of the linear groove in permeated liquid flow channel materials used in Examples 1 to 5 and Comparative examples 1 to 6, and the ratio of the groove width to the pitch of the linear groove.

Here, the evaluation conditions and results by measurement techniques in Example 1 and Comparative examples 1 to 3 are shown all together in Table 1. The evaluation conditions and results by simulation techniques in Examples 1 to 5 and Comparative examples 1 to 6 are shown all together in Table 2. Shape conditions in Examples 1 to 5 and Comparative examples 1 to 6 are shown all together in FIG. 8.

TABLE 1

|  | Groove width [µm] | Ratio of groove width to pitch of groove | Depth of groove [µm] | Thickness [µm] | S1/(S1 + S2) | Volume of permeated water [m³/day] | Salt rejection factor [%] |
| --- | --- | --- | --- | --- | --- | --- | --- |
| Example 1 | 130 | 0.52 | 110 | 220 | 0.48 | 24 | 99.75 |
| Comparative example 1 | 254 | 0.43 | 110 | 220 | 0.38 | 20 | 99.70 |
| Comparative example 2 | 254 | 0.52 | 110 | 220 | 0.63 | 19 | 99.60 |
| Comparative example 3 | 130 | 0.43 | 110 | 220 | 0.20 | 20 | 99.75 |

TABLE 2

|  | Mark | Groove width [µm] | Ratio of groove width to pitch of groove | Depth of groove [µm] | Thickness [µm] | S/(S1 + S2) | Liquidity of permeated liquid | Breakage of membrane | Breakage of permeated liquid flow channel material |
| --- | --- | --- | --- | --- | --- | --- | --- | --- | --- |
| Example 1 | E1 | 130 | 0.52 | 110 | 220 | 0.48 | Good | None | None |
| Example 2 | E2 | 80 | 0.50 | 80 | 170 | 0.48 | Good | None | None |
| Example 3 | E3 | 192 | 0.90 | 21 | 50 | 0.48 | Good | None | None |
| Example 4 | E4 | 170 | 0.68 | 80 | 170 | 0.48 | Good | None | None |
| Example 5 | E5 | 19 | 0.47 | 21 | 50 | 0.48 | Good | None | None |
| Comparative example 1 | C1 | 254 | 0.43 | 110 | 220 | 0.38 | Bad | Existence | None |
| Comparative example 2 | C2 | 254 | 0.52 | 110 | 220 | 0.63 | Bad | Existence | None |
| Comparative example 3 | C3 | 130 | 0.43 | 110 | 220 | 0.20 | Bad | None | None |
| Comparative example 4 | C4 | 8 | 0.45 | 10 | 23 | 0.61 | Bad | None | None |
| Comparative example 5 | C5 | 211 | 0.60 | 141 | 280 | 0.38 | Good | Existence | None |
| Comparative example 6 | C6 | 120 | 0.95 | 6 | 17 | 0.38 | Good | None | Existence |

An embodiment of a liquid separation device of the present invention can be suitably used for production of pure water, desalinating sea water and recovery of valuable resources in wastewater treatment and food industries, and the application range is not limited thereto.

The invention claimed is:

1. A liquid separation device comprising a permeated liquid flow channel material disposed on a back side of a separation membrane, wherein the permeated liquid flow channel material is a weft knit fabric which comprises a sheet-like material having a linear groove and a linear crest alternately arrayed on one surface or both surfaces, wherein a groove width of the linear groove in said sheet-like material is 10 to 200 µm, and a ratio of the groove width of the linear groove to the pitch of the linear groove is 0.45 or more.

2. The liquid separation device of claim 1, wherein said linear crest comprises convex parts of yarn loop arrayed in a line.

3. The liquid separation device of claim 2, wherein the knit structure of said weft knit fabric is a structure of plain knitting, a structure of interlock knitting, or both.

4. A separation membrane module, wherein the liquid separation device of claim 3 is disposed in a pressure container.

5. A treatment method using a separation membrane for desalinating sea water by the liquid separation device of claim 3.

6. The liquid separation device of claim 2, wherein an outer diameter of a knitting yarn of the weft knit fabric is 15 µm to 244 µm.

7. A separation membrane module, wherein the liquid separation device of claim 1 is disposed in a pressure container.

8. A treatment method using a separation membrane for desalinating sea water by the liquid separation device of claim 1.

9. The liquid separation device of claim 1, wherein a thickness of the sheet-like material is 30 to 300 µm, and a depth of the linear groove is 15 µm to 290 µm.

10. A liquid separation device comprising a permeated liquid flow channel material disposed on a back side of a separation membrane, wherein the permeated liquid flow channel material comprises a sheet-like material having a linear groove and a linear crest alternately arrayed on one surface or both surfaces, wherein said sheet-like material is a weft knit fabric comprising a needle loop and a sinker loop, and a ratio [S1/(S1+S2)] of a needle loop area (S1) to a sum of the needle loop area (S1) and a sinker loop area (S2) is 0.4 to 0.6.

11. The liquid separation device of claim 10, wherein the knit structure of said weft knit fabric is a structure of plain knitting, a structure of interlock knitting, or both.

12. The liquid separation device of claim 10, wherein an outer diameter of a knitting yarn of the weft knit fabric is 15 µm to 244 µm.

13. The liquid separation device of claim 10, wherein a thickness of the sheet-like material is 30 to 300 µm, and a depth of the linear groove is 15 to 290 µm.

* * * * *

UNITED STATES PATENT AND TRADEMARK OFFICE
CERTIFICATE OF CORRECTION

PATENT NO.        : 8,388,848 B2                                        Page 1 of 1
APPLICATION NO.   : 12/295133
DATED             : March 5, 2013
INVENTOR(S)       : Odaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this
First Day of September, 2015

Michelle K. Lee
*Director of the United States Patent and Trademark Office*